United States Patent [19]

Anderson

[11] Patent Number: 4,956,188
[45] Date of Patent: Sep. 11, 1990

[54] COPPER COMPLEXES WITH ALPHA HYDROXY ORGANIC ACIDS AND THEIR USE AS NUTRITIONAL SUPPLEMENTS

[75] Inventor: Michael D. Anderson, Minnetonka, Minn.

[73] Assignee: Zinpro Corporation, Chaska, Minn.

[21] Appl. No.: 390,404

[22] Filed: Aug. 7, 1989

Related U.S. Application Data

[62] Division of Ser. No. 260,023, Oct. 20, 1988.

[51] Int. Cl.$^5$ ............................................. A23K 1/00
[52] U.S. Cl. ..................................... 426/74; 426/623; 426/630; 426/807
[58] Field of Search ................. 426/74, 635, 623, 630, 426/807; 556/114, 110

[56] References Cited

U.S. PATENT DOCUMENTS

| | | | |
|---|---|---|---|
| 2,097,235 | 10/1937 | Schmidt et al. | 556/114 |
| 2,417,071 | 3/1947 | Gebhart et al. | 556/114 |
| 4,670,269 | 6/1987 | Abdel-Monem | 426/74 |

OTHER PUBLICATIONS

Morrison "Feeds & Feeding", Morrison Publishing Co., 1957, pp. 104–111.

*Primary Examiner*—R. B. Penland
*Attorney, Agent, or Firm*—Zarley, McKee, Thomte, Voorhees & Sease

[57] ABSTRACT

Complex salts of copper useful for nutritional supplementation to provide copper in a form which effectively increases the bioavailability of copper, assuring adequate dietary requirement for health and growth, with the complexes comprising copper ions complexed with certain alpha hydroxy organic acids.

2 Claims, No Drawings

COPPER COMPLEXES WITH ALPHA HYDROXY ORGANIC ACIDS AND THEIR USE AS NUTRITIONAL SUPPLEMENTS

This is a divisional of copending application Ser. No. 260,023, filed on Oct. 20, 1988.

BACKGROUND OF THE INVENTION

Copper is known to be one of the essential trace elements. An adequate supply of copper is necessary for normal animal health and growth.

Copper deficiencies are associated with anemia; poor animal growth; noticeably discolored hair; and, in the case of sheep, poor wool development because of loss of fiber strength and diameter. Copper is also known to have some important role in proper and healthy reproductive roles.

Proper uptake of copper in developing animals is also known as necessary for iron metabolism in red blood cell production, is also known as essential for proper bone development, and has been reported as necessary for adequate and proper development of an animal's immune system.

It can therefore be seen that proper dietary balance of highly bioavailable copper is important for animals, including swine and poultry. In recent times, it has been reported, particularly for swine and poultry, that they may have copper deficiencies because of the nature of their food rations. Put another way, it has been found that from time to time mycotoxins which are present in food rations, particularly corn, have a tendency to tie up the available copper in a form which makes it non-bioavailable. Thus, the net result is that the feed for the swine and the poultry, particularly corn treated with certain treatments such as Tyram ®, and mycotoxins that are found in the corn in some way bind the available copper in the feed to make it non-bioavailable. The net result is that even though one feeds to the animals much higher levels of copper than needed for the NRC (National Research Council) recommended daily allowances, the animal does not get anywhere near its adequate NRC requirement.

An additional problem is caused by feeding high levels of copper which are simply thereafter excreted without uptake. The copper in the excretement is returned to the soil, significantly raising the copper level. This may cause undesired environmental polluting problems.

It therefore can be seen that adequate dietary levels of highly bioavailable copper are necessary for development of livestock, including cattle, swine and poultry. Moreover, there is a need to present copper in a highly bioavailable form which assures that the animal will have a high level of uptake of the copper without excreting it to cause potential environmental pollution.

It is therefore a primary objective of the present invention to provide a highly effective bioavailable form of copper in convenient water soluble salt form which is available for use as a feed additive in animal nutrition.

Another important objective of the present invention is the preparation of new, complex salts of copper in which the copper is in a form that can be readily absorbed after ingestion by livestock, particularly swine, poultry and cattle.

Yet another objective of the present invention is to provide stable complexed salts of copper which, because of the complexing of copper with certain alpha hydroxy organic acids are in a highly bioavailable form.

An even further objective of the present invention is to provide a method of nutritional supplementation for animals to assure adequate dietary requirements of copper for growth and health.

An even further objective of the present invention is to provide certain complex salts of copper and certain alpha hydroxy organic acids such as glucoheptonic acid which have coordination bonds formed between the copper ion and the alpha hydroxy group of the acid, in addition to an electrostatic attraction bond between the cation and the carboxyl ions.

The method of accomplishing these as well as other objectives of the invention will become apparent from the detailed description of the invention which follows hereinafter.

SUMMARY OF THE INVENTION

This invention relates to the preparation of copper complexes having the following general formula:

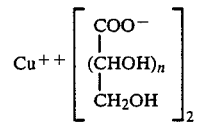

wherein n is a whole integer and equals from 1 to 5. When n=1 the acid is glyceric acid and when n=5, it is glucoheptonic acid. When n=2, the acid moiety is from erythronic or threonic acid. When n=3, the acid is arabinonic, ribonic and xylonic. When n=4, the acid is gluconic acid. These compounds, it is believed because of a complex formed between the copper cation and the alpha hydroxy acid, are in a form that is readily absorbed by domestic livestock including cattle swine and poultry. These complexes thus function as a readily available source of copper for dietary supplementation, assuring necessary copper absorption by animals needing the same for normal growth and health.

DETAILED DESCRIPTION OF THE INVENTION

The compounds of the present invention can be described as copper complex salts between the copper cation and certain alpha hydroxy organic acids of the general formula:

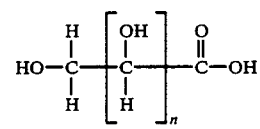

wherein n equals from 1 to 5. The preferred acid is when n equals 5, glucoheptonic acid. However, n should not increase substantially beyond 5 because compounds where n is greater than 5 are not readily available and are not commercially feasible.

It is also important to note that the compounds of this invention are copper complexes in which coordination bonds are formed between the copper cation and the alpha hydroxyl group of the acid, in addition to the electrostatic attraction between the cation and the carboxyl anions. This complex salt involving both coordination bonds and electrostatic attraction seems to enhance the bioavailability of the copper. The general formula of these complexes, illustrating both the coordination bond and the electrostatic attraction, can be represented as follows:

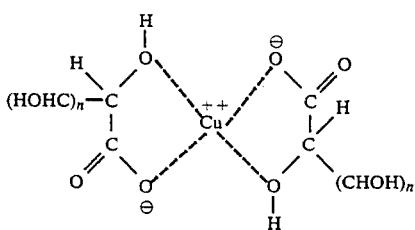

A simple and economically feasible process of preparing these copper complexes has been developed. For the sake of brevity, only examples of the preparation of a copper glucoheptonate will be described. However, these methods can easily be applied to the preparation of other copper complexes of this invention, such as the copper glycerate, erythronate and xylonate.

In accord with the process of this invention, a solution of copper sulfate whether in an anhydrous form or in a hydrated form is mixed with a bimolar amount of sodium glucoheptonate. The product, copper glucoheptonate, can be conveniently obtained from the filtrate by the addition of an organic solvent such as isopropyl alcohol, acetone, or ethyl alcohol. Alternatively, the filtrate could be dried using conventional drying methods such as hot air oven, spray drying, freeze, drying or evaporation under reduced pressure.

The same complexes of copper and alpha hydroxy organic acids may be made by reacting, for example, sodium glucoheptonate with other water soluble copper salts, such as copper chloride in place of the copper sulfate hereto mentioned. Other salts such as other copper halides could also be used, with the precise source of copper ion being not critical, except that it should be water soluble.

The level of addition of the copper alpha hydroxy acid complexes of this invention for use as a feed supplement can vary over a wide range. Preferably the level of addition is such to provide dietary intake of copper from about 0.2 parts per million to about 2.0 parts per million, and most preferably about 1.0 parts per million. These levels are satisfactorily achieved when the amount of the complex salt copper glucoheptonate, added to the animal feed, is from about 0.1 g per head of cattle per day to about 1.0 g per head of cattle per day, preferably 0.6 g per head of cattle per day. It should, however, be understood that other levels of addition can be utilized and that the precise level of addition is not in fact critical, it being adjusted for the conditions of the animals being treated with the nutritional supplement.

Importantly, one of the distinct advantages of the compounds of the present invention is that they are crystalline water soluble compounds easily processible and size reducible to a powder for use in a convenient feed supplement form. In other words, their physical form is one which is easily mixable with typical ruminant animal feeds.

In making nutritional supplements for addition to the diets of animals, it is preferred that the complexes of the present invention be added to carrier or filler materials for processibility, ease of handling and sale. Examples of suitable carriers include distillers fermentation solubles, feed grains, animal, poultry and fish bi-products and meal, whey and other cellulosic carrier materials well-known in the trace mineral product preparation techniques of the art.

The following example is offered to illustrate, but not limit, the preparation of the compounds of the present invention.

EXAMPLE I

A source of sodium glucoheptonate, sold under the trademark Seqlene 50 TM was obtained. The source of copper ion for this example is copper sulfate pentahydrate.

Copper glucoheptonate was prepared in the following manner. Sodium glucoheptonate, a 50% solution by weight of Seqlene 50 TM having a liquid weight of 1725 lbs was used. It was mixed with copper sulfate pentahydrate, 450 lbs. 200 lbs of water was added for a total liquid weight of 2375 lbs. These were mixed in the following manner. All the glucoheptonate was added to a mixer along with 200 lbs of water, and it was heated to a temperature within the range of 160° F. to 190° F., and maintained in this temperature range during the addition of copper sulfate pentahydrate. The time of stirring while maintaining within the temperature range of 160° F. to 190° F. was between 5 and 10 minutes. The original solution was brown, having an appearance similar to molasses, and as the complex of the copper glucoheptonate formed, the color gradually turned to a blackish color. The finished product was mixed with grain distillers solubles at a 50% by weight level. It had a copper guaranteed analysis of 4.5%. The copper was complexed to the glucoheptonate radical, having both coordinate bonds and electrostatic attraction. The compound's formula was: $C_{14}H_{26}O_{16}Cu \cdot X\ H_2O$. The molecular structure of the compound was as illustrated in the earlier portions of the specification as illustrated wherein n=5, for glucoheptonic acid.

This compound, if fed to livestock, particularly swine, cattle and poultry and also for example sheep at the levels specified herein, will show that the copper is in a highly bioavailable form and will provide it at levels sufficient for adequate dietary intake of copper to provide normal healthy growth, good red blood cell production, proper pigmentation for hair and wool, and at sufficient levels for normal reproductive patterns.

EXAMPLE II

A source of sodium-x-d-glucoheptonate dihydrate sold under the trademark Seqlene 540 TM was obtained. The source of copper ion for this example is copper sulfate pentahydrate.

Copper glucoheptonate was prepared in the following manner. Sodium glucoheptonate in powder form having a weight of 800 pounds was used. It was mixed with copper sulfate pentahydrate, 400 pounds. 1000 pounds of water was added for a total liquid weight of 2200 pounds. These were mixed in the following manner. All 1000 pounds of water was placed in the mixer and heated to a temperature within the range of 160° F. and 190° F. and maintained at this temperature during the addition of all 400 pounds of copper sulfate pentahydrate. The time of stirring while maintaining within the temperature range of 160° F. and 190° F. was between 5 and 10 minutes. Next, all 800 pounds of sodium glucoheptonate was added and allowed to dissolve in the solution. Immediately upon introducing the sodium glucoheptonate, the solution turns a dark blue/green color. The final product was spray dried. The resulting product had a guaranteed analysis of 10.5% Cu by weight.

Like the product of Example I, which represents the same compound prepared by a slightly different methodology, similar nutritional supplementation results may be obtained. Similar results can also be obtained with compounds of alpha-hydroxy organic acids wherein n is 1-4, in that effective nutritional supplements of a highly bioavailable form of copper are obtained.

It therefore can be seen that the invention does and will accomplish all of its stated objectives.

What is claimed is:

1. A method of assuring adequate dietary requirement for growth and production of copper in a bioavailable from, comprising: adding as a feed ration supplement to the animals' feed, a small but effective amount of a copper complex salt of the formula:

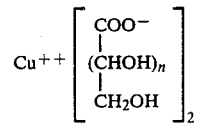

wherein n is from 1 to 5 to provide a dietary intake of copper of at least from about 0.2 parts per million to about 2.0 parts per million.

2. The method of claim 1 wherein the amount of said salt added to the animals feed is from 0.1 g to 1.0 g per head of cattle per day.

* * * * *